Feb. 2, 1943.  W. M. MULOCK  2,309,915
APPARATUS FOR CONTROLLING HEATING SYSTEMS
Filed July 9, 1941   3 Sheets-Sheet 3

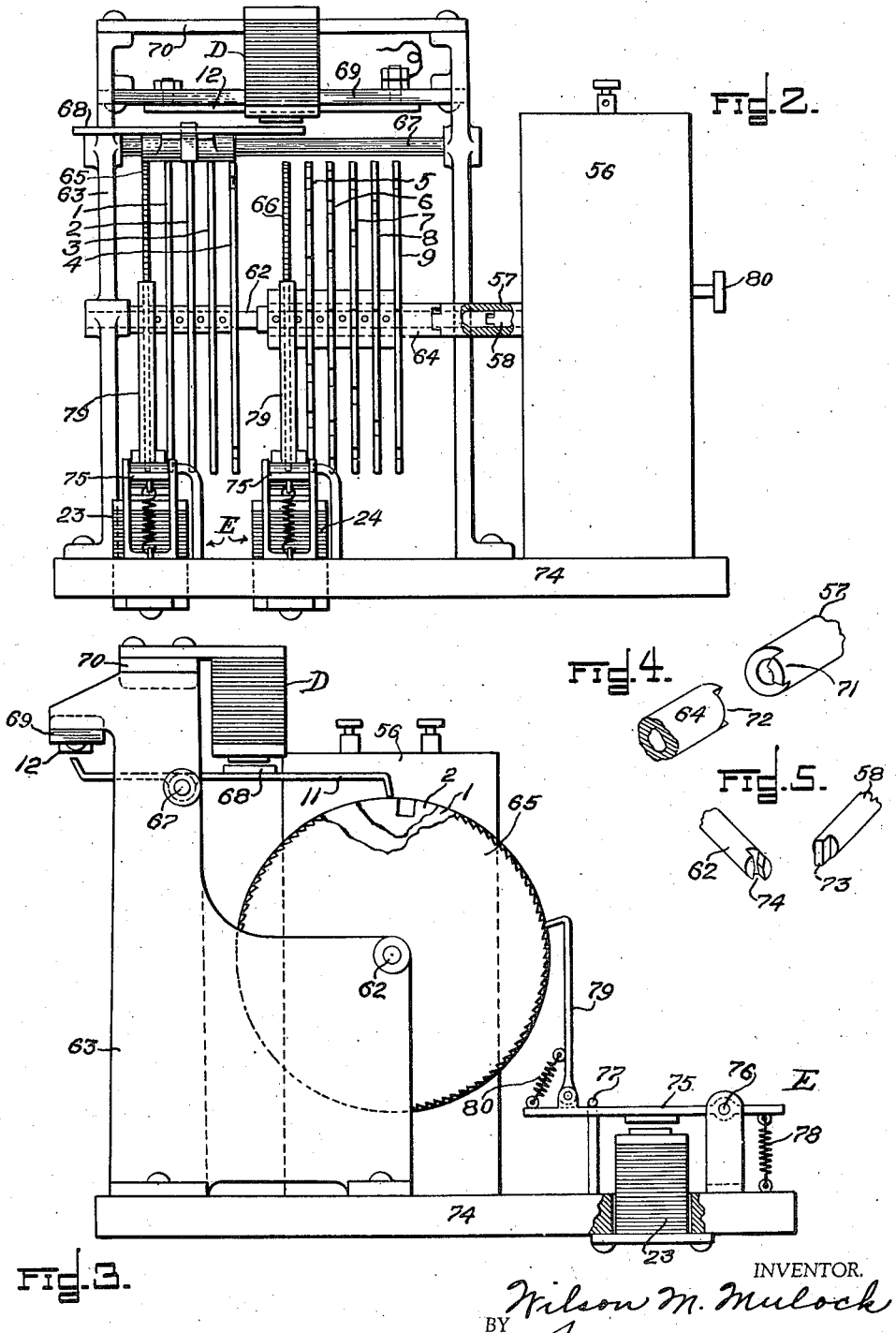

INVENTOR.
Wilson M. Mulock
BY
Arthur F. Randall
atty.

Patented Feb. 2, 1943

2,309,915

UNITED STATES PATENT OFFICE 2,309,915

APPARATUS FOR CONTROLLING HEATING SYSTEMS

Wilson M. Mulock, Chatham, Mass.

Application July 9, 1941, Serial No. 401,632

3 Claims. (Cl. 236—46)

This invention relates to apparatus for controlling the operation of heating systems and it has for its object to provide an apparatus of this class which will automatically control and operate a heating system so as to maintain its heating capacity approximately uniform, or at least within predetermined limits.

It is also an object of the invention to provide a control apparatus of the character described which can be adjusted or set to automatically maintain the heating system in operation with more or less heating capacity as may be required or necessary in connection with the service to be performed by the same.

To these ends I have provided an improved control apparatus of the character described which, in its preferred form, may be constructed and operate as set forth in the following description, the several novel features of the invention being separately pointed out and defined in the claims at the close of the description.

In the accompanying drawings:

Figure 2 is a front elevation of the time switch hereinafter referred to.

Figure 3 is a side elevation of the time switch shown in Fig. 2.

Figures 4 and 5 are details relating to the time switch.

Figures 6, 7, 8 and 9 show the four switch-operating wheels of the "minute hand" shaft hereinafter referred to.

Figures 10, 11, 12, 13 and 14 show the five switch-operating wheels of the "hour hand" shaft hereinafter referred to.

Figure 1:
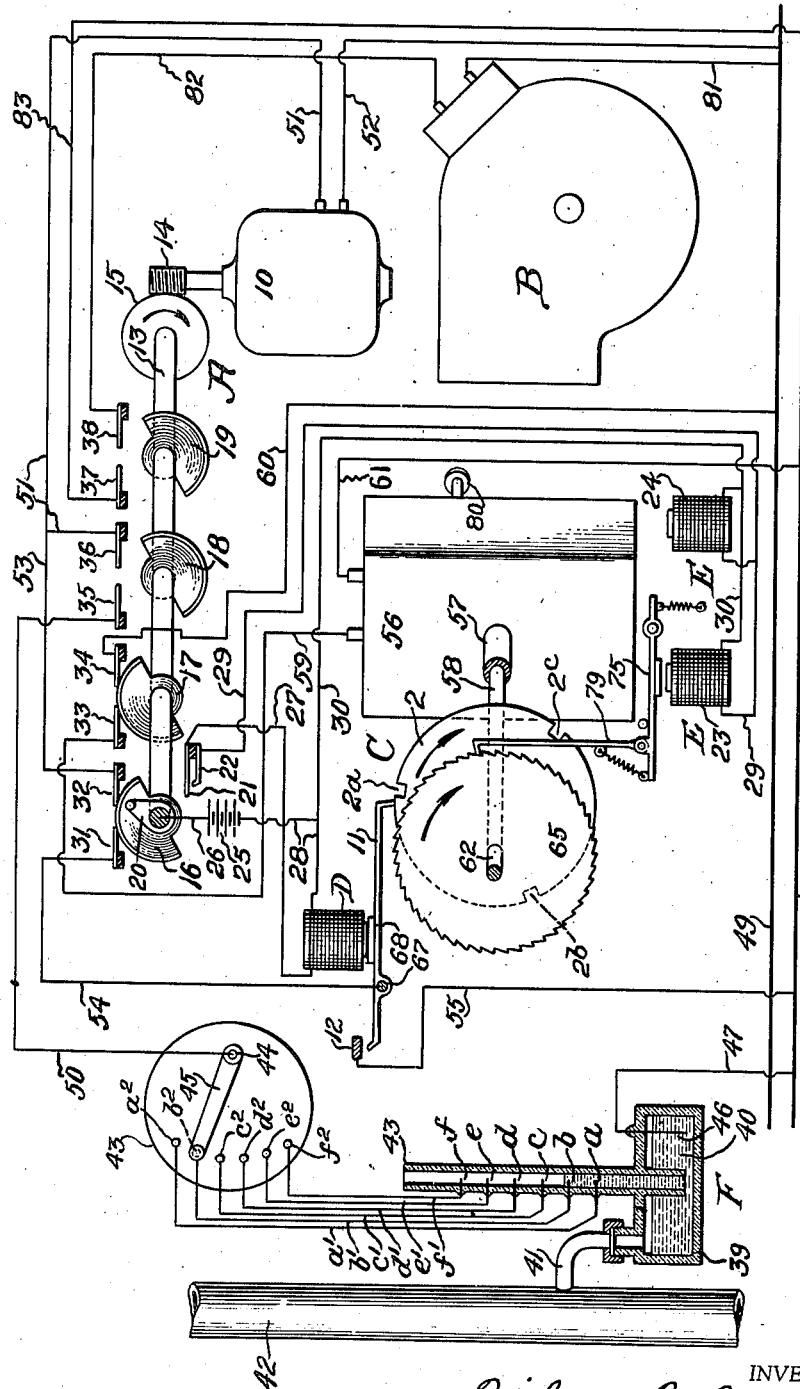
Figure 1 is a diagrammatic view illustrating one form of my invention.
Figure 6:
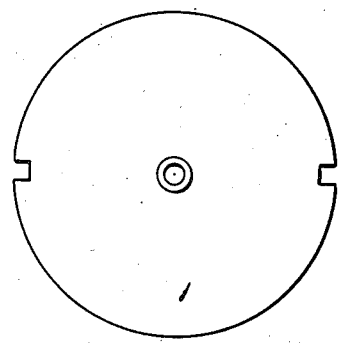
Figure 7:
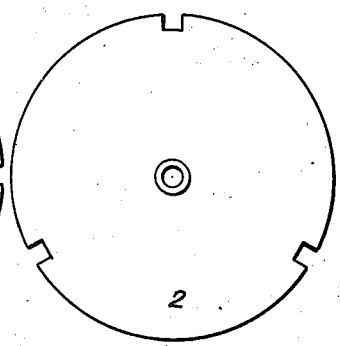
Figure 8:
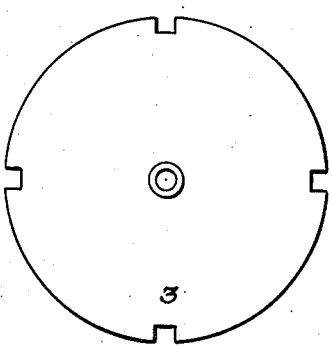
Figure 9:
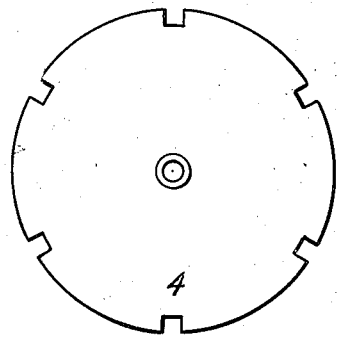
Figure 10:
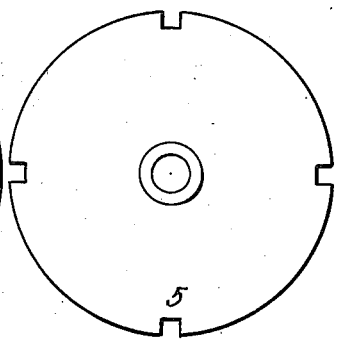
Figure 11:
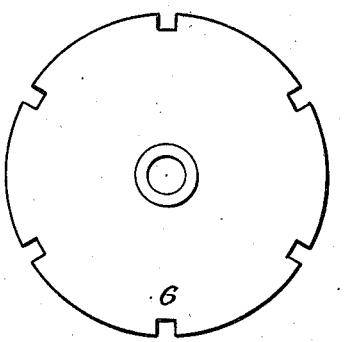
Figure 12:
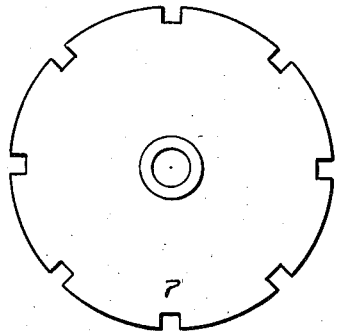
Figure 13:
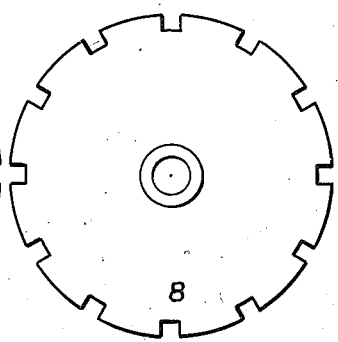
Figure 14:
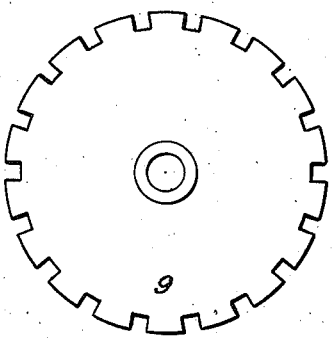

The illustrated embodiment of my invention comprises a multiple circuit-operating switch mechanism or unit A, (Fig. 1) including an actuating motor 10; a burner B by which steam is generated within the boiler (not shown) of the heating system and whose motor circuit is operated by switch mechanism A; an electrically operated master time-switch mechanism C for periodically closing a burner-starting circuit of motor 10, said time-switch mechanism including a relay comprising a pivotally supported contact member 11 cooperating with a fixed contact bar 12 and also including a magnet D that is energized to open the above mentioned burner-starting circuit of motor 10; a pair of wheel-advancing relays E; and a switch F in a burner-stopping circuit of motor 10, said switch being controlled and operated by the pressure within the heating system.

The switch mechanism A is continually operated periodically by motor 10 which, in turn, is continually operated periodically by the time-switch C acting through the elements 11—12, and each time said motor is operated a shaft 13 constituting a part of mechanism A is rotated to the extent of about 180°.

The armature shaft of motor 10 carries a worm 14 in engagement with a worm wheel 15 fast on shaft 13. On shaft 13 are secured approximately semicircular segments 16, 17, 18 and 19 of insulating material each of which carries upon its periphery a metallic shoe which serves as a bridging contact cooperating with a pair of fixed contacts as shown.

Shaft 13 also carries a radial arm 20 whose outer end is adapted to cooperate with a pair of stationarily supported spring contacts 21 and 22, the former being longer than the latter and having its free end portion disposed in the path of the outer end of arm 20 so that when said arm rotates in the direction indicated by the arrow said arm first engages contact 21 thereby closing a circuit through magnet D and immediately thereafter bends contact 21 into engagement with contact 22 thereby closing parallel circuits through the two magnets 23 and 24 of wheel-advancing relays E.

The circuit of magnet D is as follows: From a battery 25 through a wire 26 to arm 20, contact 21, a wire 27, magnet D and thence through a wire 28 back to battery 25.

The circuit of magnet 23 is as follows: From battery 25 through wire 26 to arm 20 and thence through contacts 21 and 22, a wire 29, magnet 23, and wires 30 and 28 back to battery 5. The opposite ends of the winding of magnet 24 are connected, respectively, with the wires 29 and 30 as shown in Fig. 1 so that said magnets are energized and de-energized simultaneously.

The metal shod segments 16, 17, 18 and 19 cooperate, respectively, with the pairs of fixed spring contacts 31—32, 33—34, 35—36 and 37—38.

The switch F (Fig. 1) comprises a body of non-conducting material formed with a hollow base 39 which provides a chamber for holding a body of mercury 40, the top of said chamber being made with a port connected by a conduit 41 with a riser 42 of a steam heating system, said riser connecting the boiler (not shown) of the system with the usual radiators or the like.

The top wall of base 39 is made with a vertical transparent tube 43 provided interiorly with a longitudinal series of uniformly spaced apart contacts $a$, $b$, $c$, etc., connected by wires $a'$, $b'$, $c'$, etc., with a series of contacts $a^2$, $b^2$, $c^2$, etc., fixedly mounted upon a panel of non-conducting material 43. Pivotally mounted at 44 upon panel 43 is a contact arm 45 adapted, when swung on its pivot, to traverse and individually engage contacts $a^2$, $b^2$, $c^2$, etc.

Within the base 39 of switch F is a fixed contact 46 which is always submerged within the body of mercury 40 and this contact is connected by a wire 47 with a line wire 48 of a current supplying circuit whereof the other line wire is shown at 49.

The pivoted arm 45 is connected by a wire 50 with the contact 35 of switch mechanism A while the complementary contact 36 of that pair is connected by a wire 51 with one terminal of motor 10. The other terminal of this motor is connected by a wire 52 with the line wire 49.

It will be clear that the pressure within the riser 42 is always imposed upon the top of the body of mercury 40 within base 39 and that when the heating system is in use this pressure will force a column of mercury upwardly within the tube 43, the height of said column varying directly with variations in said pressure.

The contacts $a$, $b$, $c$, etc., may be arranged and relatively spaced so that one-half pound pressure will raise the column of mercury into engagement with contact $a$; one pound pressure will raise it into engagement with the next contact $b$; one and one-half pound pressure will raise it into engagement with contact $c$, and so on throughout the series of contacts.

When in operation the apparatus functions automatically to maintain a predetermined pressure within the heating system and this pressure is determined by the setting of the adjustable arm 45. As shown in Fig. 1 said arm is set for a pressure of about one pound since it rests on contact $b^2$ that is connected by wire $b'$ with contact $b$ of switch F.

As illustrated in Fig. 1 the burner-stopping circuit of motor 10, when closed at both switches A and F, is as follows: Wires 49 and 52, motor 10, wire 51, contact 36, segment 18, contact 35, wire 50, arm 45, wire $b'$, mercury 40, wire 47 and wire 48.

The burner-starting circuit of motor 10 includes contacts 31 and 32, segment 16, a wire 53 connecting contact 32 with wire 51, a wire 54 connecting contact 31 with contact arm 11, bar contact 12, and a wire 55 connecting bar 12 with line wire 48.

The time switch C comprises an electrically operated clock work mechanism 56 of ordinary construction except that its hour hand and minute hand shafts are extended outside of the usual housing as shown at 57 and 58, respectively, (Figs. 1, 2, 4 and 5). In practice I have used the clock mechanism 56 of an ordinary electric clock.

One terminal of this motor mechanism 56 is connected by a wire 59 with the contact 33 whose complementary terminal 34 is connected by a wire 60 with line wire 49. The other terminal of mechanism 56 is connected by a wire 61 with the other line wire 48.

To the outer end of the minute shaft 58 is coupled one end of a wheel-carrying shaft 62, said end being rotatably supported by and within the tubular hour shaft 57 of mechanism 56, while the opposite end of said shaft 62 is rotatably supported within a bearing provided on a frame 63.

Rotatably mounted upon shaft 62 is a second tubular wheel-carrying shaft 64 whereof one end is coupled to the outer end of the tubular hour shaft 57 of mechanism A.

The joint connecting shafts 57 and 64 provides for limited rotative movement of the latter relatively to the former. So also, the joint connecting shaft 58 with shaft 62 provides for limited rotative movement of the latter relatively to the former.

Shaft 62 has fixed on it a ratchet wheel 65 and a plurality of contact-operating wheels 1, 2, 3 and 4, while shaft 64 has fixed on it a ratchet wheel 66 and a plurality of contact-operating wheels 5, 6, 7, 8 and 9.

The contact arm 11, hereinabove referred to, is pivotally and slidably mounted upon a rod 67 supported at its opposite ends by the frame 63 so that its axis is parallel with the axes of shafts 62 and 64. Thus it is possible to manually adjust arm 11 lengthwise on rod 67 so as to place it in position to cooperate with either of the contact-operating wheels referred to above, said arm 11 being provided with an elongate armature 68 which always occupies a position opposite the polepiece or core of magnet D and which yieldingly holds said arm in engagement with the periphery of the wheel with which it is positioned to cooperate.

The contact bar 12 with which arm 11 cooperates is fixed to a bar 69 of non-conducting material which is fastened at its opposite ends to frame 63, while the magnet D is fastened to a cross-bar 70 forming part of frame 62.

The wheels 1, 2, 3 and 4 are made, respectively, with two, three, four and six peripheral notches as shown in Figs. 6 to 9, inclusive, while the wheels 5, 6, 7, 8 and 9 are made, respectively, with four, six, eight, twelve and eighteen peripheral notches. The notches of each wheel of both sets are equidistantly spaced circumferentially and the number of notches in each wheel equally divides the number of minutes required for each revolution of its shaft, shaft 62 making one revolution in sixty minutes and shaft 64 making one revolution in seven hundred and twenty minutes.

As shown in Fig. 4 the outer end of shaft 57 is made with a lug 71 occupying a socket 72 provided upon the proximate end of shaft 64, the circumferential width of lug 71 being less than that of socket 72 in order to provide the limited lost motion connection referred to above.

As shown in Fig. 5 the outer end of shaft 58 is made with a lug 73 loosely occupying a socket 74 provided upon the proximate end of shaft 62 so as to provide the limited lost motion connection referred to above.

The frame 63 is provided with a base 74 upon which the electric clock mechanism or motor 56 and also the relays E are mounted, one of said relays occupying a position to cooperate with ratchet wheel 65 and the other occupying a position to cooperate with ratchet wheel 66.

As shown in Figs. 2 and 3, the magnets 23 and 24 of the relays are rigidly fastened to base 74 and each is provided with an armature 75 pivotally mounted at 76 on a bracket secured to said base, said armature being yieldingly supported against a stop 77 by a spring 78. Pivotally mounted upon the free end of each armature 75 is a pawl 79 whose upper free end is yieldingly held against its ratchet wheel 65, or 66, by a spring 80.

When segment 19 (Fig. 1) is in engagement with contacts 37 and 38 the circuit of burner B is completed and this circuit includes a wire 81 connecting one terminal of the burner with line wire 49; a wire 82 connecting the other terminal of the burner with contact 38; segment 39; contact 37, and a wire 83 to the other line wire 48.

In Fig. 1 of the drawings the burner-stopping circuit of motor 10 is partially closed by the mercury column at contact $b$ and in part by arm 45 at contact $b^2$, but is open at the contacts 35—36. Therefore, since contact arm 11 is at this moment supported in an elevated position by wheel 2 of the shaft 62, the burner-starting circuit of motor 10 is also open at contacts 11—12 and consequently motor 10 is at rest even though said burner-starting circuit is closed at 31—32. In Fig. 1 the circuit of clock mechanism 56 is completed at contacts 33—34 and therefore the shaft 62 and its wheels (including wheel 2) are turning in the direction of the arrow at the rate of one revolution per hour while the shaft 64 and its wheels are turning in the same direction at the rate of one revolution every twelve hours. Burner B is idle or out of action because its circuit is open at 37—38.

The wheel 2 (Figs. 1 and 7) is made with three peripheral notches and therefore the time distance between one notch and the following notch is twenty minutes. It follows that for a period of twenty minutes while notch $2^b$ (Fig. 1) is moving toward arm 11 the burner B will remain out of action and during this time the mercury column may remain in engagement with contact $b$ or it may fall below said contact.

Assuming that the mercury column remains in engagement with contact $b$, then when notch $2^b$ registers with the end of arm 11 the latter will fall into said notch thereby completing the burner-starting circuit at 11—12 since this circuit is already closed at 31—32. The motor 10 will therefore be operated to impart one-half revolution to shaft 13 which opens said burner-starting circuit at 31—32, opens the circuit of clock mechanism 56 at 33—34, closes the burner-stopping circuit at 35—36, and closes the circuit of burner B at 37—38.

During this 180° step movement of shaft 13 the arm 20 first engages contact 21 thereby momentarily energizing magnet D to move arm 11 out of the notch $2^b$ of wheel 2 and out of engagement with contact 12, and immediately thereafter said arm 20 bends contact 21 into engagement with contact 22 to momentarily energize the magnets of relays E, one of which acts through its pawl and the ratchet wheel 65 to advance wheel 2 on shaft 62 far enough to carry its notch $2^b$ out of register with the end of arm 11. Since, under the assumed conditions, the burner-stopping circuit is already closed at $b$ and $b^2$, the engagement of segment 18 with contacts 35—36 completes said burner-stopping circuit of motor 10 with the result that the motion of shaft 13 is immediately continued to the extent of a second half revolution which restores the parts to the positions shown in Fig. 1 with the exception that notch $2^b$ will be occupying the position of notch $2^a$ in said Fig. 1.

During the next twenty minutes the apparatus will remain quiescent with the burner idle except for the operation of mechanism 56 and the rotation of wheels 2 and 65 in the direction of the arrow and until notch $2^c$ registers with the end of arm 11 whereupon the described operations will be repeated if the mercury column has not fallen below contact $b$.

Assuming that the mercury column of switch F has fallen below the contact $b$ when notch $2^b$ registers with arm 11, then the movement of said arm into notch $2^b$ will close the burner-starting circuit of motor 10 at 11—12 and said motor will operate as before to rotate shaft 13 to the extent of one-half revolution and the latter will act as before to energize magnet D and relays E; to open the burner-starting circuit at contacts 31—32; to open the circuit of clock mechanism 56 at 33—34; to close the burner-stopping circuit at 35—36 but this time without effect because said circuit is already open at contact $b$ of switch F, and to close the circuit of burner B thereby causing the latter to operate.

Burner B will continue operating with clock mechanism 56 and motor 10 at rest until it has raised the pressure within the system to a point where the mercury column of switch F again engages contact $b$ which completes the burner-stopping circuit for the reason that said circuit is at this time also closed at the contacts 35—36 by segment 18. When said circuit is thus completed the motor 10 imparts another half-revolution to shaft 13 which restores the apparatus to the condition shown in Fig. 1 with motor 10 and burner B at rest and clock mechanism 56 operating to rotate the wheels of its shafts.

It will be observed that while the clock mechanism is operating the burner is at rest and that the length of its period of rest is automatically determined and controlled by the clock mechanism. Also that while the burner is operating the clock mechanism is at rest and that if the pressure within the system is low the operation of the burner will continue without material interruption until it has raised the pressure within the system to a predetermined point whereupon it is automatically stopped and the clock mechanism is automatically started.

It is also to be noted that when motor 10 is operated by the clock mechanism acting through the burner-starting circuit to start the burner at a time when the desired predetermined relatively high pressure exists within the system, then the accompanying completion of the burner-stopping circuit at 35—36 will have the effect of continuing the operation of motor 10 to the extent of another half-revolution of shaft 13 which immediately restores the parts to the positions shown in Fig. 1 with the burner at rest.

Inasmuch as the clock mechanism is stopped each time a notch of the wheel 2 arrives at arm 11 and remains at rest until the burner is stopped, it will be clear that each period of rest of the burner will be maintained for the full period of twenty minutes. It will also be clear that the short advancing step movement of wheel 2 effected by relay E prevents contact 11 from occupying one of the notches of wheel 2 when the parts of unit A are automatically returned to the positons shown in Fig. 1.

It is desirable that the length of each period of rest of the burner may be varied or adjusted so that it can be made of a length that is appropriate to the prevailing weather condition or the service to be performed by the heating system. It is for this reason that I have provided a plurality of notched wheels as described and also provided for adjustment of arm 11 longitudinally on its pivot bar 67 (Figs. 2 and 3) so that it can be positioned thereon to cooperate with either wheel to the exclusion of the others.

Wheels 1, 2, 3 and 4 of shaft 62 which makes one revolution per hour, are made, respectively, with two, three, four and six notches. When cooperating with arm 11 wheel 1 provides periods of rest of burner B of thirty minutes each; wheel 2 provides periods of rest of twenty minutes each; wheel 3 provides periods of rest of fifteen minutes each, and wheel 4 provides periods of rest of ten minutes each. Wheels 5, 6, 7, 8 and 9 of shaft 64 which makes one revolution every twelve hours, are made, respectively, with four, six, eight, twelve and eighteen notches. When cooperating with arm 11 wheel 5 provides periods of rest of burner B of three hours each; wheel 6 provides periods of rest of two hours each; wheel 7 periods of rest of one and one-half hours each; wheel 8 periods of rest of one hour each, and wheel 9 periods of rest of forty minutes each.

It will thus be apparent that by selectively utilizing the wheels 1 to 9 inclusive in connection with the contact arm 11 the length of each period of rest of the burner may be increased or shortened according to the adjustment of contact arm 11 on its pivot rod 67 and in this way the operation of the apparatus may be rendered appropriate to prevailing weather or the demands upon the heating system, said adjustment being made to increase the length of each period of rest during relatively warm weather and to shorten said periods of rest during relatively cold weather.

The limited lost motion provided between shafts 57 and 64 and also between shafts 58 and 62 provides for a short advancing step movement of the notched wheel that is in use by one or the other of the relays E so that when, immediately after said step movement, the magnet D is de-energized the contact arm 11 will fall on to the periphery of the wheel and thus be prevented from falling back into the notch from which it has just been withdrawn. In this connection it will be noted that no time is lost through this advancing step movement of the wheel for the reason that upon the subsequent starting of the clock mechanism 56 the lost motion will be taken up before the wheel is started upon its next burner-timing movement.

The clockwork mechanism 56 is constructed as usual with a finger-operated member 80 by means of which the hour shaft 57 and the minute shaft 58 are manually adjusted rotatively when necessary.

What I claim is:

1. In a heating system, in combination, an electrically operated multiple burner-controlling switch unit including a plurality of simultaneously operated make-and-break switches and an operating motor; a burner-starting circuit for said motor including one of the switches of said unit; an independently operated normally open switch in said starting circuit; a wheel for periodically closing said normally open switch; electrically operated mechanism for rotating said wheel at a predetermined speed; a circuit for said wheel-rotating mechanism including another one of the switches of said unit which is opened to stop said mechanism when said unit is adjusted through operation of said starting circuit and motor by said normally open switch; a burner-stopping circuit for said motor including another one of the switches of said unit which is closed when said unit is adjusted through operation of said starting circuit and motor, and a second switch in said burner-stopping circuit which is opened and closed through variations of a condition of the heated medium within the system thereby automatically to control the length of time the burner of the system continues in operation after each burner-starting adjustment of said unit.

2. In a heating system, the combination of claim 1 wherein said last-mentioned element is a pressurestat switch.

3. In a heating system, the combination of claim 1 wherein said normally open switch of the starting circuit comprises a movable switch element co-operating with a switch-closing notch provided upon the periphery of said wheel, and wherein means is provided through which said unit acts to slightly advance said wheel rotatively independently of said wheel-rotating mechanism immediately after each operation of said starting circuit thereby to shift said notch away from said element.

WILSON M. MULOCK.